United States Patent [19]

Pelliconi et al.

[11] Patent Number: 5,541,260

[45] Date of Patent: Jul. 30, 1996

[54] POLYPROPYLENE COMPOSITIONS HAVING GOOD TRANSPARENCY AND IMPROVED IMPACT RESISTANCE

[75] Inventors: Anteo Pelliconi; Antonio Ciarrocchi; Paola Massari, all of Ferrara, Italy

[73] Assignee: Montell North America Inc., Wilmington, Del.

[21] Appl. No.: 399,959

[22] Filed: Mar. 6, 1995

Related U.S. Application Data

[63] Continuation of Ser. No. 167,263, Dec. 15, 1993, abandoned.

[30] Foreign Application Priority Data

Dec. 15, 1992 [IT] Italy .................... MI92A2856

[51] Int. Cl.$^6$ .................... C08L 23/08; C08L 23/16; C08L 23/14
[52] U.S. Cl. .................... 525/240; 525/322; 525/323
[58] Field of Search .................... 525/322, 323, 525/240

[56] References Cited

U.S. PATENT DOCUMENTS

| | | | |
|---|---|---|---|
| 4,245,062 | 1/1981 | Suzuki et al. | 525/323 |
| 4,395,519 | 7/1983 | Minami et al. | 525/240 |
| 4,434,264 | 2/1984 | Ficker . | |
| 4,547,552 | 10/1985 | Toyota et al. | 525/247 |
| 4,576,994 | 3/1986 | Dorrer et al. | 525/247 |
| 4,634,740 | 1/1987 | Fujita et al. . | |
| 4,734,459 | 3/1988 | Cecchin et al. . | |
| 5,023,300 | 6/1991 | Huff et al. | 525/194 |
| 5,250,631 | 10/1993 | McCullouh . | |
| 5,298,561 | 3/1994 | Cecchin et al. . | |

FOREIGN PATENT DOCUMENTS

| | | |
|---|---|---|
| 120562 | 10/1984 | European Pat. Off. . |
| 0145368 | 6/1985 | European Pat. Off. . |
| 0170255 | 2/1986 | European Pat. Off. . |
| 0294770 | 12/1988 | European Pat. Off. . |
| 0373660 | 6/1990 | European Pat. Off. . |
| 0452813 | 10/1991 | European Pat. Off. . |
| 0557953 | 9/1993 | European Pat. Off. . |

*Primary Examiner*—Carman J. Seccuro, Jr.

[57] ABSTRACT

Disclosed is a polymer composition containing:
(A) from 70 to 98 parts by weight of a crystalline propylene homopolymer, or a crystalline random copolymer of propylene with ethylene and/or $C_4$–$C_{10}$ α-olefins, containing from 0.5 to 10% by weight of ethylene and/or α-olefins [fraction (A)]; and
(B) from 2 to 30 parts by weight of elastomeric copolymer of ethylene with one or more $C_4$–$C_{10}$ α-olefins, containing from 60 to 85% by weight of ethylene, and partially soluble in xylene at 25° C. [fraction (B)];
wherein the composition has an intrinsic viscosity value in tetrahydronaphthalene at 135° C. of the fraction soluble in xylene at 25° C. ranging from 0.8 to 1.1 dl/g.

7 Claims, No Drawings

POLYPROPYLENE COMPOSITIONS HAVING GOOD TRANSPARENCY AND IMPROVED IMPACT RESISTANCE

This application is a continuation of application Ser. No. 08/167,263, filed Dec. 15, 1993, now abandoned.

The present invention relates to polypropylene compositions having improved impact resistance characteristics and good transparency.

It is known that for certain applications it is useful to decrease the crystallinity of the propylene homopolymer by copolymerization of the propylene with small quantities of ethylene and/or α-olefins such as 1-butene, 1-pentene and 1-hexene. In this manner one obtains the so called random crystalline propylene copolymers which, when compared to the homopolymer, are essentially characterized by better flexibility and transparency.

These materials can be used in many application sectors, such as, for example irrigation pipes, pipes for transporting drinking water and other liquid food, heating equipments, single layer bottles (for detergents), multilayer bottles (for beverages and perfumes), single layer or multilayer film for various packaging and rigid food containers.

Propylene random copolymers, however, although they have good transparency, do not offer, especially at low temperatures, sufficiently better impact resistance than the homopolymer which can be satisfactory used for the applications listed above.

It has been known for a long time that the impact resistance of the polypropylene can be improved by adding an adequate quantity of elastomeric propylene-ethylene copolymer to the homopolymers by mechanical blending or sequential polymerization. However, this improvement is obtained at the expenses of the transparency of the material.

To avoid this inconvenience, U.S. Pat. No. 4,634,740 suggests the blending of the polypropylene, in the molten state, with propylene-ethylene copolymers obtained with specific catalysts, and having an ethylene content ranging from 70 to 85% by weight. However, the preparation of such compositions requires the separate synthesis of the homopolymer and the copolymer, and their subsequent blending. This clearly presents a disadvantage in terms of the investment and production cost involved in producing such material. Moreover, said compositions present transparency values (Haze) substantially comparable to those of the propylene homopolymer. Said patent, therefore, does not teach how to obtain compositions having good transparency.

A further disadvantage of the compositions described in the above mentioned U.S. patent is that the propylene-ethylene copolymer is synthesized with catalysts which lack a sufficiently high catalytic activity to avoid the purification process.

In order to overcome the above mentioned disadvantages the Applicant has previously produced transparent polypropylene compositions offering impact resistance at low temperatures, which can be prepared directly in polymerization (sequential copolymerization). Said compositions, which constitutes the subject of published patent application EP-A-373660, comprise both a crystalline random propylene copolymer, and an elastomeric copolymer of ethylene with propylene and/or $C_4$–$C_8$ α-olefins containing from 20 to 70% by weight of ethylene. According to said patent application, the compositions mentioned above have a good balance of mechanical and chemical-physical properties due to the fact that the value of the content of ethylene of the elastomeric copolymer multiplied by the value of the ratio between the intrinsic viscosity (I.V.) of the elastomeric copolymer soluble in xylene at ambient temperature, and the one of the propylene random copolymer is comprised within a predetermined range. However, the values of the Izod impact resistance at 0° C. and the ductile/fragile transition temperature render said compositions inadequate for use at low temperatures, such as in the case of food preservation.

Published European patent application EP-A-0557953, in the name of the Applicant, describes polyolefin compositions where one obtains a good balance of transparency, stiffness, and impact resistance even at low temperatures, by modifying a crystalline random copolymer of propylene with the proper quantities of a mechanical mixture comprising an elastomeric copolymer and one or more polymers chosen from LLDPE, LDPE and HDPE.

New polypropylene compositions have now been found which have an optimum balance of transparency, stiffness and impact resistance even at low temperatures.

Accordingly, the present invention provides polymer compositions comprising:

(A) from 70 to 98 parts by weight of a crystalline propylene homopolymer, or a crystalline random copolymer of propylene with ethylene and/or $C_4$–$C_{10}$ α-olefins, containing from 0.5 to 10% by weight of ethylene and/or α-olefins [fraction (A)]; and (B) from 2 to 30 parts by weight of elastomeric copolymer of ethylene with one or more $C_4$–$C_{10}$ α-olefins, containing from 60 to 85% by weight of ethylene, and partially soluble in xylene at 25° C. [fraction (B)]; wherein said composition has an intrinsic viscosity value in tetrahydronaphthalene at 135° C. of the fraction soluble in xylene at 25° C. ranging from 0.8 to 1.1 dl/g.

The preferred polymer compositions are those with an intrinsic viscosity value ranging from 0.9 to 1.1 dl/g, limits included.

Also preferred are the polymer compositions where fraction (A) constitutes 75 to 85 parts by weight of the polymer composition, while fraction (B) constitutes 15 to 25 parts by weight of said composition.

The preferred quantity of ethylene and/or $C_4$–$C_{10}$ α-olefin present in the copolymer of fraction (A) ranges from 1 to 5% by weight.

The quantity of ethylene present in the copolymer of fraction (B) preferably is from 63 to 85% by weight, most preferably from 65 to 75%.

Examples of $C_4$–$C_{10}$ α-olefins that can be used as comonomers in fractions (A) and (B) are 1-butene, 1-pentene, 1-hexene and 4-methyl-1-pentene. Particularly preferred is 1-butene.

The polymer compositions of the present invention have MFR values (ASTM D 1238 L) preferably ranging from 7 to 20 g/10 min.

Moreover, generally said compositions have flexural modulus values ranging from 500 to 1600 MPa, and ductile/fragile transition temperatures ranging from +10° to −50° C.

In order to obtain improved transparency and stiffness, the polymer compositions of the present invention may optionally be nucleated with substances commonly used for this purpose, such as dibutylidenesorbitol (DBS). The nucleating agents are preferably added in quantities ranging from 1000 to 3000 ppm.

The compositions of the present invention can be prepared by sequential copolymerization of the monomers in the presence of stereospecific Ziegler-Natta catalysts supported on magnesium dihalides.

The polymerization is carried out in at least two steps: in the first stage, one carries out the synthesis of the polymer of fraction (A), in the second one, the synthesis of the polymer of fraction (B). The synthesis of the latter occurs in the presence of the polymer obtained and the catalyst used in the preceding stage.

The polymerization process may be done in a continuous or batch manner, following known techniques, operating in liquid phase [for fraction (A)], optionally in the presence of an inert diluent, or in a gaseous phase, or with mixed liquid-gas techniques. Preferably the polymerization is conducted in gas phase. The polymerization of fraction (B) is conducted in gas phase.

Reaction times and temperatures relative to the two steps are not critical and are advantageously in the range from 0.5 to 5 hrs, and from 50° C. to 90° C. respectively. Regulation of the molecular weight is done by using molecular weight regulators commonly used, e.g. hydrogen and $ZnEt_2$.

The aforementioned intrinsic viscosity values of the fraction soluble in xylene at 25° C. which characterizes the compositions of this invention, are obtained by using higher amounts of the molecular weight regulator. When fraction (B) is synthesized using hydrogen as the molecular weight regulator, the molar ratio of hydrogen to ethylene is from 0.7 to 1.0.

The catalysts that can be used to produce the polymer compositions of the present invention are well known in patent literature. Particularly suited are the catalysts described in U.S. Pat. No. 4,339,054 and European Patent No. 45977. Other examples of catalysts are described in U.S. Pat. No. 4,472,524 and 4,473,660.

The above mentioned stereospecific catalysts used in the polymerization comprise the product of the reaction between:

a) a solid component, containing a titanium compound and an electron-donor compound (internal electron-donor) supported on magnesium chloride, b) an aluminum alkyl compound (cocatalyst) and c) an electron-donor compound (external electron-donor).

Said catalysts are preferably capable of producing homopolymer polypropylene having an isotactic index higher than 90%.

The solid catalyst component (a) contains as electron-donor a compound selected among the ethers, ketones, lactones, compounds containing N, P and/or S atoms, and mono- and dicarboxylic acid esters.

Particularly suited are phthalic acid esters such as diisobutyl, dioctyl and diphenyl phthalate, monobenzyl monobutyl phthalate; malonic acid esters such as diisobutyl and diethyl malonate; alkyl and arylpivalates; alkyl, cycloalkyl and aryl meleates; alkyl and aryl carbonates such as diisobutyl carbonate, monoethyl monophenyl carbonate, and diphenyl carbonate; succinic acid esters such as mono- and diethyl succinate. Other electron-donors particularly suited are the 1,3-diethers of formula (I),

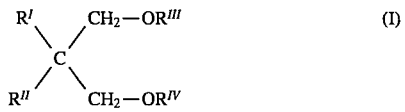

wherein $R'$ and $R''$, are the same or different and represent $C_1$–$C_{18}$ alkyl, $C_3$–$C_{18}$ cycloalkyl, or $C_6$–$C_{18}$ aryl radicals; $R'''$ and $R^{IV}$, are the same or different and are alkyl radicals with 1 to 4 carbon atoms.

The ethers of the type described are illustrated in published European patent application EP-A-361 493.

Examples representative of ethers of formula (I) are 2-methyl-2-isopropyl-1,3-dimethoxypropane, 2,2-diisobutyl-1,3-dimethoxypropane, and 2-isopropyl-2-cyclopentyl-1,3-dimethoxypropane.

The preparation of the described catalyst components is done according to various methods. One of them consists of milling or co-milling the magnesium dihalide (used in the anhydrous state containing less than 1% water), together with the titanium compound, and the electron-donor compound under conditions where the magnesium dihalide is activated; the milled product is then treated one or more times with excess $TiCl_4$ at temperatures from 80° to 135° C., and subsequently washed repeatedly with a hydrocarbon (hexane, for example) until the chlorine ions have disappeared from the wash waters.

According to another method the anhydrous magnesium halide is preactivated following known methods, and then reacted with excess $TiCl_4$ containing the electron-donor compound in solution. In this case the operation also takes place at a temperature from 80° to 135° C. Optionally the $TiCl_4$ treatment is repeated. The solid is then washed with hexane or other solvents to eliminate all traces of unreacted $TiCl_4$.

According to another method, a $MgCl_2$ nROH adduct (particularly in the form of spherical particles) where n is generally a number ranging from 1 to 3 and ROH is ethanol, butanol or isobutanol, is reacted with excess $TiCl_4$ containing the electron-donor compound in solution. The reaction temperature generally ranges from 80 to 120° C. After the reaction the solid is isolated and reacted one or more times with $TiCl_4$, and then washed with a hydrocarbon solvent until all traces of unreacted $TiCl_4$ have been eliminated.

According to yet another method, magnesium alcoholates and chloroalcoholates (the chloroalcoholates can be prepared according to U.S. Pat. No. 4,220,554) are reacted with excess $TiCl_4$ containing the electron-donor compound in solution, operating under the same conditions already described.

The titanium compound in the solid catalyst component, expressed as Ti content, is generally present in the amount ranging from 0.5 to 10% by weight, and the quantity of the electron-donor compound that remains set on the solid (internal donor) usually ranges from 5 to 20% in moles with respect to the magnesium dihalide.

Titanium compounds which can be used for the preparation of catalyst components are halides or halogen alcoholates. Titanium tetrachloride is the preferred compound. Satisfactory results are obtained also with titanium trihalides, particularly $TiCl_3HR$ (HR=Hydrogen Reduced), $TiCl_4ARA$ (ARA=Aluminum Reduced and Activated), and with titanium halide alcoholates such as $TiCl_3OR$, where R is a phenyl radical.

The preparations indicated above lead to the formation of activated magnesium dihalide. Besides the ones already mentioned, other reactions are known in the art which lead to the formation of activated magnesium dihalides starting from magnesium compounds which are different from the magnesium halides, such as magnesium carboxylates.

The active form of magnesium halides in the solid catalyst component can be recognized by the fact that in the X-ray spectrum of the catalyst component the major intensity reflection presents a width at half-peak at least greater than 30% with respect to the major intensity reflection which appears in the spectrum of the nonactivated magnesium dihalide, or by the fact that the major intensity reflection (which appears in the spectrum of the nonactivated magnesium halides, having a surface area smaller than 3 m$^2$/g) is absent and in its place there is a halo with the maximum intensity shifted with respect to the position of the maximum intensity reflection of the nonactivated magnesium dihalide. The most active forms of magnesium halide are those where the X-ray spectrum shows a halo.

Among the magnesium dihalides, the magnesium chloride is the preferred compound. In the case of the most active forms of magnesium chloride, the X-ray spectrum of the catalyst component shows a halo instead of the reflection, which in the spectrum of the nonactivated magnesium chloride is situated at the distance of 2.56 Å.

As cocatalysts (b), one preferably uses the trialkyl aluminum compounds, such as Al-triethyl, Al-triisobutyl and Al-tri-n-butyl. Other examples of cocatalysts (b) are the linear or cyclic Al-alkyl compounds containing two or more Al atoms bonded by means of O, or N atoms, or by $SO_2$, $SO_3$ or $SO_4$ groups. Some examples of these compounds are:

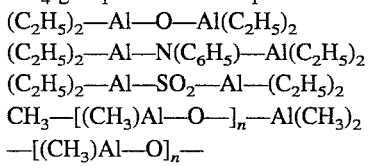

$(C_2H_5)_2$—Al—O—Al$(C_2H_5)_2$
$(C_2H_5)_2$—Al—N$(C_6H_5)$—Al$(C_2H_5)_2$
$(C_2H_5)_2$—Al—$SO_2$—Al—$(C_2H_5)_2$
$CH_3$—[$(CH_3)$Al—O—$]_n$—Al$(CH_3)_2$
—[$(CH_3)$Al—O—$]_n$— wherein n is a number from 1 to 20.

In general, the Al-Alkyl compound is present in quantities that allow the Al/Ti ratio to vary from 1 to 1000.

The electron-donor compounds (c) that can be used as external electron-donors (added to the Al-alkyl compound) comprise the aromatic acid esters (such as alkylic benzoates), heterocyclic compounds (such as the 2,2,6,6-tetramethylpiperidine and the 2,6-diisopropylpiperidine), and in particular silicon compounds containing at least one Si—OR bond (where R is a hydrocarbon radical). Some examples of silicon compounds are: (tert-$C_4H_9)_2$Si$(OCH_3)_2$, $(C_6H_5)_2$Si$(OCH_3)_2$ and $(C_6H_5)_2$Si$(OCH_3)_2$. The 1,3-diethers of formula (I) are also suitable to be used as external donors. In the case that the internal donor is one of the 1,3-diethers of formula (I), the external donor can be omitted.

The catalysts can be precontacted with small quantities of olefins (prepolymerization), maintaining the catalyst in suspension in a hydrocarbon solvent, and polymerizing at temperatures ranging from ambient to 60° C. The quantity of polymer produced is from 0.5 to 3 times the weight of the catalyst.

The prepolymerization can also be carried out in liquid propylene under the temperature conditions indicated above, and can produce quantities of polymer that can reach up to 1000 g per gram of catalyst component.

The data reported in the examples relative to the composition and properties of the polymer compositions have been determined by way of the following methods:

Intrinsic viscosity: in tetrahydronaphthalene at 135° C.

MFR: according to ASTM D-1238, condition L.

Ethylene content ($C_2$): IR spectroscopy.

Fractions soluble and insoluble in xylene: dissolving a sample of the material in xylene at 125° C. and allowing the solution to cool to ambient temperature. The soluble and insoluble fractions are separated by filtration.

Flexural modulus: according to ASTM D-790 (tangent).

Impact resistance (Izod): according to ASTM D-256 (notched specimen).

Ductile/fragile transition temperature: by internal Himont method, where the ductile/fragile transition is defined as the temperature at which 50% of the specimens present fragile cracks when subjected to the impact of a ram having a predetermined weight and falling from a given height.

Haze: according to ASTM D-1003 on 1 mm thick specimens.

Melting point: by way of DSC.

Elongation at yield: according to ASTM D-638.

Elongation at break: according to ASTM D-638.

VICAT: according to ASTM D-1525.

The following examples are given in order to illustrate and not limit the present invention.

Preparation of catalyst component (a)

The solid catalyst component used in the examples is prepared as follows.

In inert atmosphere are introduced, into a reactor equipped with agitator, 28.4 g of $MgCl_2$, 49.5 g of anhydrous ethanol, 100 ml of ROL OB/30 vaseline oil, 100 ml of silicone oil with a viscosity of 350 cs, and the content is then heated to 120° C. until the $MgCl_2$ is dissolved. The hot reaction mixture is then transferred to a 1500 ml vessel equipped with a T-45 N Ultra Turrax agitator, said vessel containing 150 ml of vaseline oil and 150 ml of silicon oil. The temperature is maintained at 120° C., while the agitation continues for 3 minutes at 3000 rpm. The mixture is then discharged to a 2 liter vessel equipped with agitator and containing 1000 ml of anhydrous n-heptane cooled to 0° C. The particles obtained are recovered by filtration, washed with 500 ml of n-hexane, and the temperature is gradually increased from 30 to 180° C. in nitrogen flow until an $MgCl_2 \cdot 2,1 C_2H_5OH$ adduct is obtained.

25 g of the adduct are transferred to a reactor equipped with agitator and containing 625 ml of $TiCl_4$, at 0° C. and under agitation. The temperature is brought to 100° C. and the mixture is heated at that temperature for one hour. When the temperature reaches the 40° C., one adds diisobutyl phthalate in such a quantity that the magnesium molar ratio with respect to the phthalate is 8.

The content of the reactor is heated to 100° C. for 2 hours under agitation, and then the solid is allowed to settle, after which the liquid is syphoned while still hot. 550 ml of $TiCl_4$ are added, and the mixture is heated to 120° C. for one hour under agitation. The agitation is interrupted, the solid is allowed to settle, and the liquid is syphoned while still hot. The solid is washed 6 times with 200 ml of n-hexane each time at 60° C., and then 3 times at room temperature.

Polymerization

The polymerization is carried out in continuous in a series of reactors equipped with devices to transfer the product from one reactor to the one immediately next to it.

In the following examples the polymerization process is preceded by prepolymerization, which is carried out in a reactor in the presence of an excess of liquid propylene, said prepolymerization lasting from about 1.5 to about 2 minutes, and at a temperature ranging from 20 to 24° C.

The prepolymer is then transferred to the first reactor where the polymerization takes place in gas phase in order to form fraction (A).

The polymer of fraction (A) is fed from the first to the second reactor after all the unreacted monomers have been eliminated. Fraction (B) is formed in this reactor.

In the prepolymerization and polymerization examples are used, together with solid catalyst component (a) (prepared as described above), the triethylaluminum (TEAL), as cocatalyst, and the dicyclopentyl-dimethoxysilane (DCPMS) as external electron-donor. The weight ratios between TEAL and DCPMS, and TEAL and Ti are reported in Table 1.

Table 2 shows the temperature, pressure and molar ratios of the monomers introduced in the single reaction stages.

In gas-phase the hydrogen and monomers are continuously analyzed by gas chromatography, and the desired concentrations are maintained constant through proper feeding.

During the course of the single polymerization steps the temperature and the pressure are maintained constant.

Tables 3 and 4 show the composition characteristics and the properties of the products of the examples according to the invention (Examples 1–3) and the comparative example (1c).

TABLE 1

| Example | 1 | 2 | 3 | 4 |
|---|---|---|---|---|
| TEAL/DCPMS | 5.4 | 3.6 | 5.8 | 4.0 |
| TEAL/Ti | 6.2 | 7.2 | 7.7 | — |

TABLE 2

| Examples | 1 | 2 | 3 | 1c |
|---|---|---|---|---|
| 1st gas phase reactor | | | | |
| Temperature (°C.) | 75 | 75 | 75 | 75 |
| Pressure (bar) | 22.5 | 22.5 | 24.0 | 17.0 |
| Residence time (min) | 65 | 64 | 69 | — |
| $H_2/C_3$ (moles) | 0.02 | 0.02 | — | 0.035 |
| $C_2/(C_2 + C_3)$ (moles) | 0.01 | 0.005 | 0.006 | — |
| 2nd gas phase reactor | | | | |
| Temperature (°C.) | 70 | 70 | 70 | 70 |
| Pressure (bar) | 12 | 12 | 15 | 11.5 |
| Residence time (min) | 29 | 25 | 53 | — |
| $H_2/C_2$ (moles) | 0.8 | 0.81 | 0.8 | 0.5 |
| $C_4/(C_4 + C_2)$ (moles) | 0.5 | 0.5 | 0.5 | 0.5 |

TABLE 3

| Example | 1 | 2 | 3 | 1c |
|---|---|---|---|---|
| Fraction (A) (parts by wt.) | 81.1 | 80.0 | 74.4 | 75 |
| $C_2$ in Fraction (A) (% by weight) | 2.0 | 1.0 | 1.3 | 45 |
| Solubility in xylene of Fraction (A) (parts by wt.) | 4.4 | 3.2 | 5.9 | 4.5 |
| $C_2$ in Fraction (B) (% by weight) | 70.0 | 70.0 | 65.0 | 65 |
| I.V. of fraction soluble in xylene | 0.93 | 0.96 | 0.93 | 1.28 |

TABLE 4

| Examples | 1 | 2 | 3 | 1c |
|---|---|---|---|---|
| MFR "L" (g/10 min) | 9.0–9.5 | 12–13 | 9–10 | 12 |
| Flex. modulus (MPa) | 900–950 | 1050–1150 | 800–850 | 890 |
| IZOD at 23° C. (J/m) | 410 | 250 | 600 | 580 |
| IZOD at 0° C. (J/m) | 70 | 45 | 480 | — |
| Ductile/Fragile transition temp. (°C.) | −27.0 | −26.0 | −40.0 | −42 |
| Yield stress (MPa) | 24.0 | 27.0 | 20.6 | 21 |
| Elongation at break (%) | 500 | 500 | 500 | 500 |
| Melt temp. (°C.) | 153 | 158 | 154 | 154 |
| VICAT (°C.) | 130.0 | 137.0 | 128.0 | 128 |
| Haze[1] (%) | 16 | 20 | 18 | 31 |

[1] values obtained after the addition of DBS (2500 ppm)

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A polymer composition obtained by sequential polymerization in the presence of a stereospecific Ziegler-Natta catalyst consisting essentially of
   (A) from 70 to 98 parts by weight of a crystalline propylene homopolymer, or a crystalline random copolymer of propylene with ethylene and/or $C_4$–$C_{10}$ α-olefins, containing from 0.5 to 10% by weight of ethylene and/or α-olefins (fraction (A)); and
   (B) from 2 to 30 parts by weight of elastomeric copolymer of ethylene with one or more $C_4$–$C_{10}$ α-olefins, containing from 60 to 85% by weight of ethylene and partially soluble in xylene at 25° C. (fraction (B));
   wherein
   said composition has an intrinsic viscosity value in tetrahydronaphthalene at 135° C. of the fraction soluble in xylene at 25° C. ranging from 0.8 to 1.1 dl/g, and said composition has a ductile/fragile transition temperature of −50° to −26° C.

2. The composition of claim 1 having an intrinsic viscosity value in tetrahydronaphthalene at 135° C. of the fraction soluble in xylene at 25° C. ranging from 0.9 to 1.1 dl/g.

3. The composition of claim 1, wherein fraction (B) is a copolymer of ethylene with 1-butene.

4. The composition of claim 2, wherein fraction (B) is a copolymer of ethylene with 1-butene.

5. The composition of claim 1, wherein fraction (A) constitutes from 75 to 85 parts by weight and fraction (B) constitutes from 15 to 25 parts by weight of the polymer composition.

6. The composition of claim 1, wherein fraction (A) is a copolymer of propylene containing from 0.5 to 10% by weight of ethylene and/or $C_4$–$C_{10}$ α-olefins.

7. A process for the preparation of the composition of claim 1, wherein fraction (A) is produced in a first polymerization step operating in the presence of a stereospecific catalyst supported on active magnesium dihalide, and fraction (B) is produced in a second polymerization step operating in the presence of the polymer and the catalyst coming from the preceding step.

* * * * *

UNITED STATES PATENT AND TRADEMARK OFFICE
CERTIFICATE OF CORRECTION

PATENT NO. : 5,541,260
DATED : July 30, 1996
INVENTOR(S) : Anteo Pelliconi et al It is certified that error appears in the above-indentified patent and that said Letters Patent is hereby corrected as shown below:

At col. 4, line 45, change "$TiCl_4ARA$" to --$TiCl_3ARA$--.

At col. 5, line 28, change the first occurrence of "$(C_6H_5)_2Si(OCH_3)_2$" to --$(C_6H_{11})_2Si(OCH_3)_2$--.

Signed and Sealed this

Twenty-fourth Day of December, 1996

Attest:

BRUCE LEHMAN

*Attesting Officer*     *Commissioner of Patents and Trademarks*